Aug. 26, 1924.
H. W. ROGERS
1,506,446
SYSTEM OF MOTOR CONTROL
Filed May 12, 1922
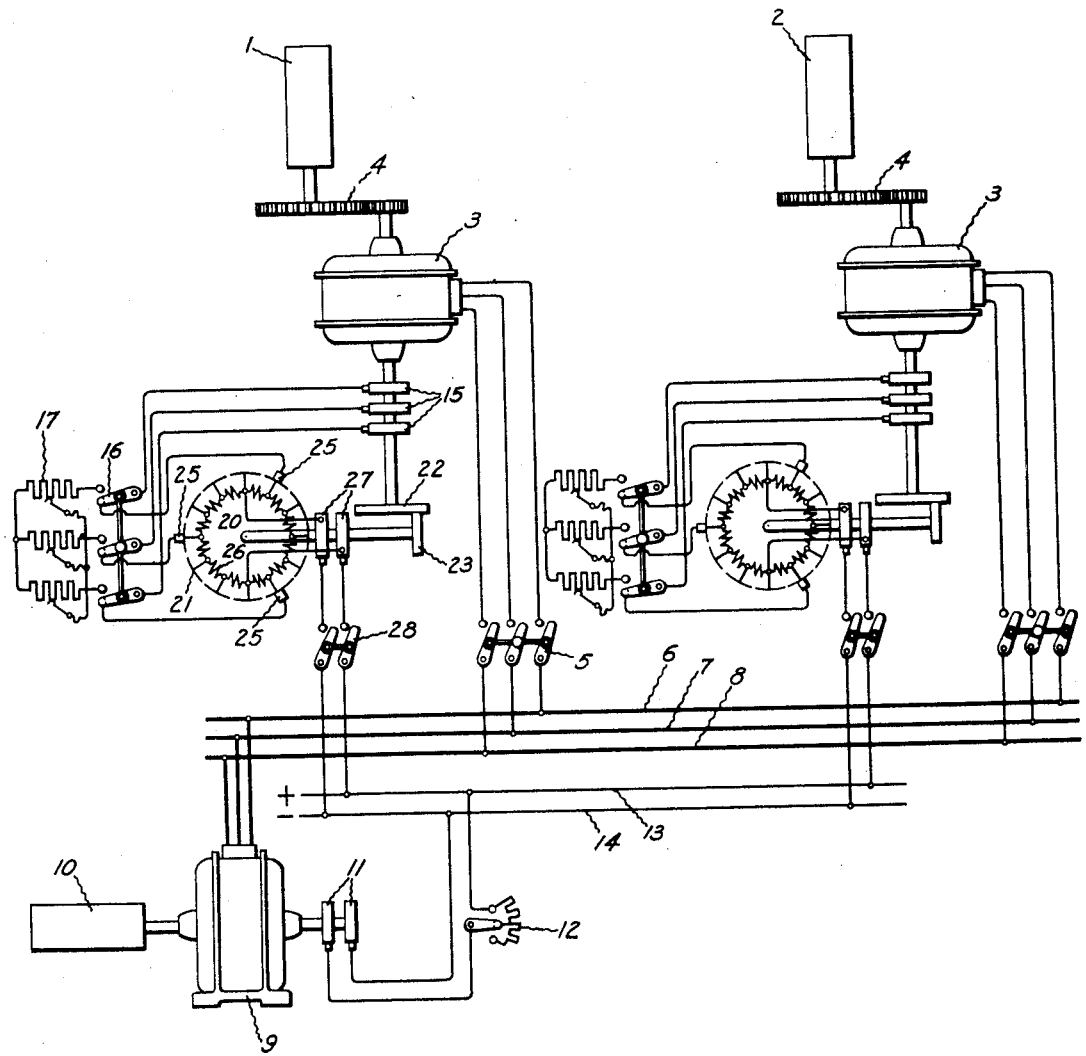
Inventor:
Harold W. Rogers,
by Albert G. Davis
His Attorney.

Patented Aug. 26, 1924.

1,506,446

UNITED STATES PATENT OFFICE.

HAROLD W. ROGERS, OF SCHENECTADY, NEW YORK, ASSIGNOR TO GENERAL ELECTRIC COMPANY, A CORPORATION OF NEW YORK.

SYSTEM OF MOTOR CONTROL.

Application filed May 12, 1922. Serial No. 560,484.

*To all whom it may concern:*

Be it known that I, HAROLD W. ROGERS, a citizen of the United States, residing at Schenectady, county of Schenectady, State of New York, have invented certain new and useful Improvements in Systems of Motor Control, of which the following is a specification.

My invention relates particularly to segregated drives for paper machines and the like in which a plurality of driven elements are normally required to operate in fixed speed relation and in which it is essential that the speed of any individual element of this machine, as well as of the machine as a whole, be readily adjustable. In segregated drives for paper machines, or the like, it is absolutely necessary for a successful operation of the machine that each element of the machine be so arranged that the speed thereof may be varied to adjust the speed relation between the various elements, and that after the speed of each element has been properly adjusted the speed relationship of the various elements be maintained fixed regardless of any changes in the load, or other conditions, which tend to disturb the speed at which the driving motor of any individual element tends to run.

One of the objects of my invention is to provide an improved system of control for an electric motor, whereby the speed of the motor may be nicely adjusted and automatically maintained as adjusted.

A further object of my invention is to provide a simple and efficient form of control for alternating current motors employed in a segregated drive whereby the speed relationship of the various machine elements is maintained absolutely fixed while at the same time this fixed speed relationship may be readily adjusted.

In accordance with my invention, I provide each element of the machine with an alternating current driving motor having phase-wound windings on its stator and rotor, a source of alternating current adapted to supply alternating current to one of said phase-wound windings of all the motors and means associated with each element and adapted to supply alternating current of any desired frequency and phase rotation to the other phase-wound winding of the corresponding driving motor. Means are also provided for each motor whereby the motor may be started and stopped without interfering with the operation of any of the other motors of the machine.

My invention will be better understood from the following description taken in connection with the accompanying drawing, and its scope will be pointed out in the appended claims.

Referring to the accompanying drawing, which illustrates one embodiment of my invention, 1 and 2 represent elements of a machine to be controlled. Each element is represented, in this case, as being driven by an alternating current motor 3 through the reduction gearing 4. Each motor 3 is provided with a phase-wound rotor and stator. In the arrangement shown each motor is provided with a three-phase wound stator winding which is adapted to be connected by means of a switch 5 to the three-phase mains 6, 7 and 8. These mains 6, 7 and 8 are connected to a three-phase wound generator 9 driven by any suitable type of constant speed prime mover, the speed of which, however, being adjustable. The generator 9 is shown as being of the rotating field type, the field winding being connected by means of the slip rings 11 to the direct current mains 13 and 14 which are connected to any suitable source of direct current. An adjustable resistance 12 is connected in the circuit of the field winding of the generator so as to adjust the voltage of the generator. Each motor 3 is indicated as being provided with a three-phase winding connected to the slip rings 15 which in turn are adapted to be connected by means of switch 16 to a starting resistance 17.

In order to maintain an absolutely fixed speed relationship between the various elements of the machine each driving motor is provided, in accordance with my invention, with a rotary converter or transformer 20 of any suitable type whereby an alternating current of any desired frequency may be supplied to the rotor winding of the corresponding motor. In the arrangement shown, each rotary converter comprises a commutator 21 connected to the rotor of the corresponding driving motor 3 by a variable speed adjusting mechanism of any suitable type. This speed adjusting mechanism is shown as consisting of a disc 22 mounted on the shaft of the driving motor and in frictional engagement with a disc 23 mounted on the same shaft with the commutator 21. The speed of each commutator 21 may be adjusted with reference to the speed of the corresponding driving motor by varying the position of the disc 23 with reference to the axis of rotation of the disc 22 in any suitable manner. It is obvious that the farther the point of engagement of the disc 23 is from the axis of rotation of the disc 22 the greater will be the speed of the commutator 21, and, also, that if the point of engagement is in line with the axis of rotation of the disc 22 no rotation of the disc 23 will take place. Furthermore, it will be apparent that the direction of rotation of the disc 23 when it is in engagement with the disc 22 on one side of the axis of rotation of disc 22 will be opposite to that of the disc 23 when it is in engagement with the disc 22 on the other side of the axis of rotation of the disc 22. Brushes 25 are arranged to engage the commutator 21 and to be connected to the slip rings 15 by means of the switch 16. The number of brushes will correspond to the number of phases for which the rotor is wound, and, therefore, in the arrangement shown, three brushes spaced 120° apart are provided. Sections of a resistance 26 are connected to the segments of the commutator 21 and diametrically opposite points of this resistance are connected to the slip rings 27 which in turn are connected by means of a switch 28 to the direct current mains 13 and 14. Inasmuch as the brushes 25 are placed 120° apart and direct current is supplied to diametrically opposite points of the resistance 26, it will be apparent that a three-phase alternating current is supplied to the corresponding rotor winding through the brushes 25. The frequency of this alternating current will be directly proportional to the speed of the commutator, and therefore the frequency of the alternating current supplied may be readily adjusted by merely changing the speed of the commutator.

It is well known that if both members of an alternating current motor are provided with phase-wound windings and alternating current is supplied to each winding, the rotor of the motor will run at a synchronous speed which is equal to the difference between the synchronous speed of the rotating magnetic field set up by the alternating current supplied to the stator winding of the motor and the synchronous speed of the rotating magnetic field set up by the alternating current supplied to the rotor winding when both magnetic fields rotate in the same direction and at a synchronous speed, which is equal to the sum of the synchronous speed of the rotating magnetic field set up by the alternating current supplied to the stator winding and the synchronous speed of the rotating magnetic field set up by the alternating current supplied to the rotor winding when the magnetic fields rotate in opposite directions. For example, if each member of the motor is provided with a two-pole winding and an alternating current of 60 cycles is supplied to the stator winding and an alternating current of 30 cycles is supplied to the rotor winding, the rotor will run at a constant speed of 1800 R. P. M. when the rotating fields set up in both members rotate in the same direction and at a constant speed of 5400 R. P. M. when the rotating fields set up in both members rotate in opposite directions. Inasmuch as the stator and rotor of each driving motor, in the arrangement shown, are supplied with alternating current, it will be obvious, therefore, that each motor will run at a constant speed determined by the frequency of the alternating current supplied to its stator and the frequency of the alternating current supplied to its rotor winding. It will be apparent also that the speed of any motor may be readily varied without affecting the operation of any other motor by merely shifting the position of the disc 23 so as to vary either the speed of the corresponding commutator 21 or both the speed and direction of rotation of the commutator.

The arrangement shown in the drawing may be set into operation by starting the motors 3 either simultaneously, or in succession. If the motors are to be started simultaneously the switches 5 and 28 are closed and the switch 16 moved into the position shown in the drawing so that each set of brushes 25 is connected to the slip rings 15 of the corresponding driving motor. Each speed adjusting mechanism is adjusted so that the point of engagement of the disc 23 with the disc 22 is in line with the axis of rotation of the corresponding disc 22. Therefore, each commutator 21 remains stationary when the corresponding motor begins to rotate. The prime mover 10 is then started and gradually brought up to the speed necessary for driving the generator at the proper speed to cause it to supply alternating current of the desired frequency to the mains 6, 7 and 8. Inasmuch as the stator winding of each driving motor 3 is connected to the mains 6, 7 and 8 and each resistance 26 is connected to the rotor winding of the corresponding driving motor 3, it is obvious that each motor will start as an induction motor and gradually increase its speed as the frequency of the current supplied by the generator 9 is increased.

After the speed of the prime mover has been adjusted to the desired value, the speed of each motor is adjusted by varying the point of engagement of the discs 22 and 23 of the corresponding speed adjusting mechanism. If it is desired to have a motor run at a faster speed than the speed of the rotating magnetic field set up by the current in the stator winding thereof, the corresponding speed adjusting mechanism is so adjusted that the commutator 21 rotates in the proper direction to cause the magnetic field set up by the current supplied to the rotor winding to rotate in the opposite direction to that in which the magnetic field set up by the current in the stator winding rotates. If it is desired to have a motor run at a slower speed, than the speed of the rotating magnetic field set up by the current in the stator winding, the corresponding speed adjusting mechanism is so adjusted that the commutator 21 rotates in the proper direction to cause the magnetic field set up by the current supplied to the rotor winding to rotate in the same direction in which the magnetic field set up by the current in the stator winding rotates.

After the speed of each motor has been adjusted to the proper value by adjusting its corresponding speed adjusting mechanism it will be apparent that this speed relationship will be maintained absolutely fixed since each motor will run at a constant speed determined by the frequency of the current supplied by the generator 9 and the setting of the corresponding speed adjusting mechanism.

The speed of the machine as a whole may be adjusted without changing this speed relationship of the motors by varying the speed of the prime mover 10. Inasmuch as such prime mover speed adjusting means are well known I deem it unnecessary to show or describe any particular form of speed adjusting means. It is also apparent that the speed of any motor may be adjusted without affecting the speed of any other motor of the machine by merely varying the point of engagement of the discs 22 and 23 of the corresponding speed adjusting mechanism.

If the motors are to be started in succession, the switches 5 are opened, the switches 28 are closed, the switches 16 are moved so that they connect each starting resistance 17 to the rotor winding of the corresponding motor and the speed adjusting mechanism are adjusted so that each commutator will remain stationary when the corresponding motor begins to rotate. The prime mover 10 is then started and the speed thereof adjusted so that the frequency of current supplied by the generator 9 is a desired value. Switch 5 of the first motor to be started is then closed and the motor starts and runs as an induction motor. After the motor has been started the switch 16 is moved so as to disconnect the starting resistance 17 from the circuit of the rotor winding and to connect the resistance 26 in the circuit of the rotor winding. The speed adjusting mechanism is then adjusted so that the alternating current supplied to the rotor winding is of the proper frequency and phase rotation to cause the motor to run at the desired speed. The remaining motors are then started and the speed thereof adjusted in the same manner.

While I have shown and described only one embodiment of my invention, it is obvious that many variations and modifications may be made therein and I deem to cover all such variations and modifications in the appended claims.

What I claim as new and desire to secure by Letters Patent of the United States, is,—

1. The combination with an alternating current driving motor having phase-wound rotor and stator elements, of means adapted to supply alternating current of a predetermined frequency to one winding of said motor, and means for determining the speed of said motor comprising a commutator for said motor, a resistance connected to segments of said commutator, means adapted to supply direct current to said resistance, brushes of a number corresponding to the number of phases of the winding on the other element of the motor mounted for relative rotation with respect to said commutator, and an adjustable speed mechanism for driving said commutator and brushes relatively from the motor shaft.

2. The combination with an alternating current driving motor having phase-wound rotor and stator elements, of means adapted to supply alternating current of a predetermined frequency to one winding of said motor, and means for determining the speed of said motor comprising a commutator for the motor, a resistance connected to segments of said commutator, means adapted to supply direct current to said resistance, brushes of a number corresponding to the number of phases of the winding on the other element of the motor mounted for relative rotation with respect to said commutator, an adjustable speed mechanism for driving said commutator and brushes relatively from the motor shaft, a starting resistance, and switching means adapted to connect said starting resistance to the phase-wound winding on said other element of the motor and to disconnect said brushes from said winding.

3. In an electric drive of the class described wherein a plurality of elements are arranged to run in fixed speed relation, the combination with a driven element, of an alternating current motor having phase-wound rotor and stator elements for driving the said element, means adapted to supply alternating current of a predetermined frequency to one winding of said motor, and means for determining the speed of said motor comprising a source of direct current, means for connecting said source of direct current to the other winding of said motor and an adjustable speed mechanism mechanically connected with said motor and adapted to cause the current supplied by said direct current source to the winding of said motor to vary in said winding as an alternating current of any desired frequency.

4. In an electric drive of the class described wherein a plurality of elements are arranged to run in fixed speed relation, the combination with a driven element, of an alternating current motor having phase-wound rotor and stator elements for driving said element, means adapted to supply alternating current of a predetermined frequency to one of the elements of said motor, and means for determining the speed of said motor comprising a commutator for the motor, a resistance connected to segments of said commutator, means adapted to supply direct current to said resistance, brushes of a number corresponding to the number of phases of the winding on the other element of the motor mounted for relative rotation with respect to said commutator, and an adjustable speed mechanism adapted to drive said commutator and brushes relatively from the motor shaft in opposite directions.

5. In an electric drive of the class described wherein a plurality of elements are arranged to run in fixed speed relation, the combination with a driven element, of an alternating current motor having phase-wound rotor and stator elements for driving the said element, means adapted to supply alternating current of a predetermined frequency to one of the elements of said motor, and means for determining the speed of said motor comprising a commutator for the motor, a resistance connected to segments of said commutator, means adapted to supply direct current to said resistance, brushes of a number corresponding to the number of phases of the winding on the other element of the motor mounted for relative rotation with respect to said commutator, and an adjustable speed mechanism for driving said commutator from the motor shaft, said mechanism being adapted to drive said commutator in opposite directions.

6. In an electric drive of the class described wherein a plurality of elements are arranged to run in fixed speed relation, the combination with a driven element, of an alternating current motor having phase-wound rotor and stator elements for driving said element, an alternating current generator adapted to supply alternating current to one element of said motor, an adjustable constant speed prime mover for driving said generator, and means for determining the speed of said motor comprising a commutator for each motor, a resistance connected to segments of said commutator, means adapted to supply direct current to said resistance, brushes of a number corresponding to the number of phases of the winding on the other element of the motor mounted for relative rotation with respect to said commutator, and an adjustable speed mechanism for driving said commutator and brushes relatively from the motor shaft.

In witness whereof, I have hereunto set my hand this 8th day of May, 1922.

HAROLD W. ROGERS.